Figure 1:
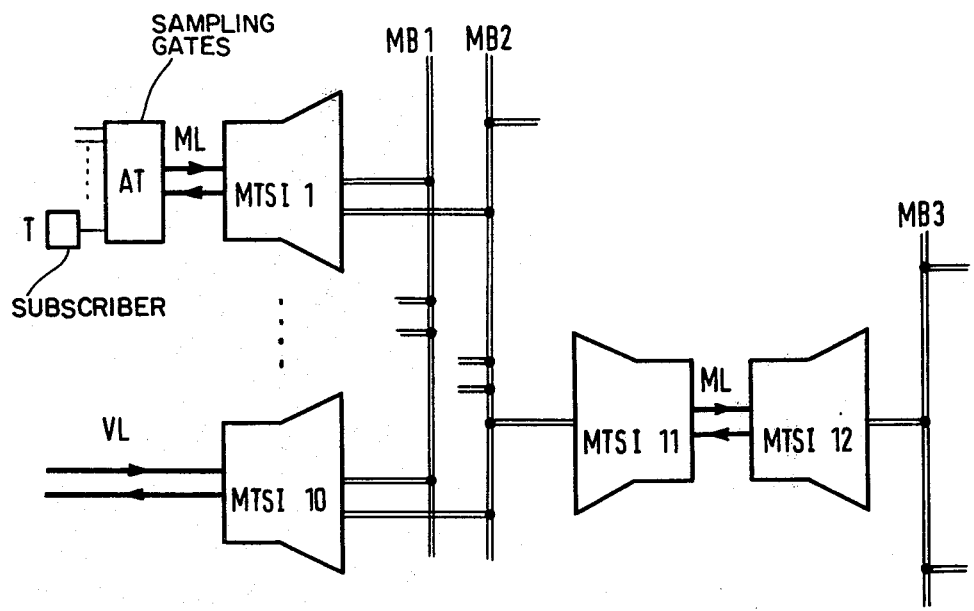

United States Patent [19]

Langenbach-Belz et al.

[11] 4,164,627
[45] Aug. 14, 1979

[54] TIME DIVISION SWITCHING NETWORK USING TIME SLOT INTERCHANGERS

[75] Inventors: Manfred Langenbach-Belz, Stuttgart; Kurt Strunk, Sachsenheim, both of Fed. Rep. of Germany; Marcel Vervloet, Berchem, Belgium

[73] Assignee: International Standard Electric Corporation, New York, N.Y.

[21] Appl. No.: 852,843

[22] Filed: Nov. 18, 1977

[30] Foreign Application Priority Data

Nov. 20, 1976 [DE] Fed. Rep. of Germany ....... 2652920

[51] Int. Cl.² .......................................... H04Q 11/04
[52] U.S. Cl. ............................................... 179/15 AQ
[58] Field of Search ..................... 179/15 AQ, 15 AT

[56] References Cited
U.S. PATENT DOCUMENTS 3,838,222  9/1974  Krupp ............................ 179/15 AQ
4,074,072  2/1978  Christensen et al. ........... 179/15 AQ

OTHER PUBLICATIONS

"A Bid for the Digital Future" by George J. Smith, *Telephony*, Jul. 19, 1976, pp. 42-45.

Primary Examiner—Thomas W. Brown
Attorney, Agent, or Firm—James B. Raden; Marvin M. Chaban

[57] ABSTRACT

A time division network using time slot interchangers for interfacing between groups of terminal circuits and a time division highway and for interfacing between different time division highways. All interchangers are of uniform construction and each performs a conversion from one number of channels at one end to a greater number of channels at the other end. When highways of the same number of channels are to be interconnected, two interchangers are arrayed between the highways in series with the one end of the respective interchangers coupled together.

7 Claims, 2 Drawing Figures

TIME DIVISION SWITCHING NETWORK USING TIME SLOT INTERCHANGERS

BACKGROUND OF THE INVENTION

Circuits for interchanging data between time slots in a time division telecommunications system are generally known in the art, as shown in U.S. Pat. No. 3,740,483 to T. Pedersen issued June 19, 1973 for Time Division Switching System with Bilateral Time Slot Interchangers.

German Auslegeschrift No. (DT-AS) 1,278,542 and its U.S. counterpart U.S. Pat. No. 3,281,536 issued Oct. 25, 1966 disclose a network which includes one or more time switches in the form of buffer stores through which connections can be set up via a plurality of series-connected time-division-multiplex highways in time slots alternating from one time-division-multiplex highway to another. The inlet and outlet highways of the time switches have the same number of time slots.

From German Auslegeschrift No. (DT-AS) 1,295,675 as originally filed in the U.S. on Mar. 30, 1965 by P. O. Dahlman as Ser. No. 443,980, abandoned, it is known to set up connections between time-division-multiplex highways via one of a plurality of selectively usable time-division-multiplex links. Here, no time switches are provided, and the parallel connection of a plurality of time-division-multiplex links serves to avoid blocking by occupied time slots.

From No. DT-ASs 1,236,022, 1,216,377, 1,412,686, and 1,243,734 various forms of time-division-multiplex switching networks are known wherein paths can be set up via several lengths of time-division-multiplex highways to be connected together. No. DT-AS 1,216,377 (and its U.S. counterpart U.S. Pat. No. 3,029,311 issued 4/10/62 to P. W. Ward) gives a particularly detailed description of all control actions necessary to search and possibly select and occupy a free time slot.

No. DT-AS 2,103,393 discloses a circuit arrangement for switching a speech path through a time-division-multiplex exchange wherein a major number of gates are contained in an integrated-circuit module.

The object of the multi-stage switching network according to the invention is to set up connections between subscribers and junction lines to other exchanges. A special problem lies in the fact that time-division-multiplex exchanges require some central control circuitry, so it is important to allow for good possibilities of expansion which involves no disproportionate expense incurred by the expansion of the central control.

The switching network according to the invention is characterized in that all time switches are of uniform construction and perform a conversion from a time-division-multiplex highway with a small number of channels to a time-division-multiplex highway with a large number of channels and conversely, that a plurality of time switches are connected in groups and in parallel to at least one of the time-division-multiplex highways with a large number of channels, and that paths between two time-division-multiplex highways with an equal number of channels extend through two series-opposed time switches between which the path extends via a time-division-multiplex highway with a different number of channels. The uniformity of the time switches permits a higher production rate and, thus, a saving in cost. In addition, the amount of circuitry required in the central control of the exchange is reduced, because all expansions and additions necessitate only the addition of identical partial functions. Compared to this, the cost and complexity of two series-opposed time switches at places where a simple slot change would be sufficient is not so high.

A special development is characterized in that the time switches contain memories for PCM-coded information and cyclic control memories which permit a set-up path to be cyclically switched through the time switches without the aid of a central control. This integration of the control memories is only possible because, once a path has been set up, all time switches operate in the same way irrespective of their specific switching functions.

As a rule, the time-division-multiplex highways with a small number of channels will transfer bits serially, and the time-division-multiplex highways with a large number of channels will transfer bits in parallel over several conductors.

This limits the additional conductors required to short lengths of highway, while serial transfer takes place on all possibly longer lengths of highway.

A special development of the switching network according to the invention is characterized in that each group of time switches connected in parallel at the output end has access to a plurality of selectively usable time-division-multiplex highways with a large number of channels. This increases reliability and the traffic volume capable of being handled within a group.

A special development of the invention is characterized in that internal subscribers of the exchange are connected to the time-division-multiplex highway with a small number of channels via sampling gates, or that said time-division-multiplex highway leads as a junction to another exchange or to a concentrator. This freedom of wiring results from the uniform operation of the time switches. The number of subscribers connectable to a time-division-multiplex highway with a small number of channels is limited by the number of channels.

There are two possibilities of establishing a new connection. One possibility is to control the establishment of a new connection from a central control which selects and occupies usable time-division-mulitplex highways and time slots on the basis of destination information fed in over the subscriber lines or in a data channel of the junction.

Another possibility is to establish a new connection in two steps, in the first of which the control of the time switch concerned searches for, selects and occupies a free path to a register without any intervention by a central control, and in the second of which a free path to said destination is searched for, selected and occupied on the basis of the destination information evaluated in the register. The switching network according to the invention is particularly flexible when expansions are necessary; on the one hand, it is characterized by the fact that all changes of traffic intensity are effected by suitably interconnecting time-division-multiplex highways of a small number of channels via time switches connected to time-division-multiplex highways of a large number of channels and by subsequent splitting into a greater or smaller number of time-division-multiplex highways of a small number of channels via time switches connected in series opposition. On the other hand, it is characterized by the fact that all gradings and group-selection stages between time-division-multiplex highways of a large number of channels are formed by a corresponding split up into time-division-multiplex highways of a small number of channels via time switches and by a subsequent combination into destination-group-forming time-division-multiplex highways of a large number of channels via time switches connected in series opposition.

A special development of the switching network according to the invention is characterized in that the time switches, including the associated control circuits, are made using integrated circuit technology. In this instance, the uniform design of all time switches is particularly cost-saving.

Figure 2:
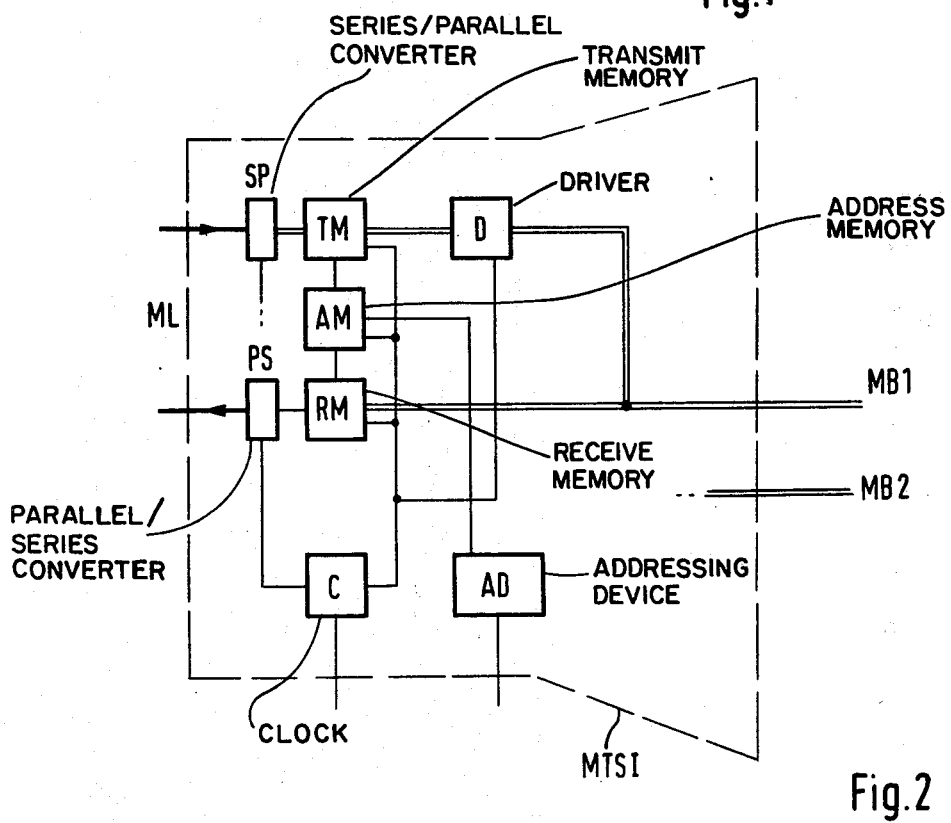

The invention will now be explained with reference to the accompanying drawing, showing, by way of example, preferred embodiments of the invention, and in which:

FIG. 1 is a block diagram of a switching network according to the invention, and FIG. 2 is a block diagram of a time switch as shown in the switching network of FIG. 1.

In FIG. 1, a time-division-multiplex highway ML with a small number of channels, e.g. a 32 time-slot highway, is connected to one side of a time switch MTSI 1. Two arrows indicate that the information is transmitted from and to the time switch MTSI 1 in four-wire operation. At the time switch MTSI 1 the highway ML leads to a block of sampling gates AT with the aid of which information from connected subscribers T is sampled, encoded as PCM words, and time-interleaved on the highway ML in known manner. Decoders and filters (not shown) ensure in known manner that each subscriber receives the information of that time slot of the highway ML which has been occupied for him.

Connected to the other side of the time switch MTSI 1 is a time-division-multiplex highway MB1 with a larger number of channels, e.g. a 256 time-slot highway. With unchanged cutoff frequency of the information to be switched, the sampling periods of the highways ML and MB1 are identical. The greater number of channels on the highway MB1 can be handled, for example, by transferring the information in parallel over several conductors, while on the highway ML the PCM words are transferred serially.

When a demand for a signal path is initiated, a central control (not shown) determines which time slots on the highways ML and MB1 to be connected together and, if need be, whether additional highways are available for the new connection. On each of the highways, a time slot is selected and occupied for the new connection. These time slots are not generally identical on the highways to be connected together. The function of the time switch MTSI 1 is, besides the serial-parallel conversion, to continuously permit a slot change for each connection.

The slot change to be performed by a time switch remains unchanged for the duration of each call. Therefore, the time switch can perform this task independently without the help of the central control. An embodiment of the independent control of such a time switch will be explained below with the aid of FIG. 2.

In FIG. 1 it is indicated that a plurality of time switches are connected to the highway MB1. A last time switch MTSI 10 establishes a connection to a highway VL leading as a junction to another exchange or connected to a remote concentrator. What matters for the switching network according to the invention is that the time switch MTSI 10 fulfils the same function with respect to the junction VL as does the time switch MTSI 1 with respect to the time-division-multiplex highway ML. In the group of time switches MTSI 1 to MTSI 10, each time switch can thus have a highway ML or a junction VL connected thereto. Even a connection of individual subscribers to a junction leading to a different exchange is of no consequence for the operation of the switching network according to the invention.

Thanks to the greater number of channels on the highway MB1 it is possible to handle on such a highway the traffic of many time switches. The number of time switches connected to a highway MB1 can also be increased freely as the number of connected subscribers grows, while the number of subscribers connectable to a time switch MTSI 1 is limited by the smaller number of channels on the highway ML. If the capacity of the highway MB1 becomes insufficient because the traffic volume increases, a second highway MB2 can be connected in parallel, as indicated in FIG. 1. This parallel connection can also be performed if the capacity of the highway MB1 is sufficient to afford safety against the failure of a highway. In any case, it must be decided during the establishment of a connection via which of the highways MB1, MB2 the connection is to be made.

In FIG. 1, the whole traffic between the subscribers, exchanges and concentrators connected to the illustrated group of time switches MTSI 1 to MTSI 10 is handled via the highways MB1, MB2. Analogously, there are other groups of time switches, which are not shown. FIG. 1 shows only one additional highway MB3 having a large number of channels and belonging to such a different group of time switches.

According to the invention, the traffic between two such groups of time switches and, consequently, between the highways MB2, MB3 is handled via two series-opposed time switches MTSI 11, MTSI 12 which are identical in construction and operation with the time switches MTSI 1 to MTSI 10 although they perform quite a different switching function. "Series-opposed" means here that those ends of the two time switches having a highway with a small number of channels connected thereto face each other. These two sides of the time switches MTSI 11, MTSI 12 are interconnected through a highway ML whose operation corresponds exactly to that of the highway ML having a small number of channels and connected to the time switch MTSI 1, but it, too, fulfils a different switching function.

At first sight it seems paradoxical to handle the highly concentrated traffic between the two highways MB2, MB3 having large number of channels via two time switches and an interposed highway ML with a small number of channels, because the traffic capacity limited by the small number of channels of the highway ML could just as well be handled by a single time switch without additional losses or limitations. Nevertheless, thanks to the uniform construction of all time switches and because of the small amount of external control circuitry required, the switching network according to the invention represents an economical solution. If the traffic offered between the highways MB2 and MB3 exceeds a predetermined limit, it is only necessary to connect two additional, series-opposed time switches in parallel with the time switches MTSI 11, MTSI 12. Likewise, the chain can be continued from the highway MB3 via two additional, series-opposed time switches to an additional highway with a large number of channels. In this manner, a switching network can be realized which is easy to adapt to any special case of traffic distribution and changes in traffic volume and, nevertheless, requires only a small amount of central control circuitry which is similar for all stages.

FIG. 2 shows a block diagram of a time switch MTSI. Connected to the left-hand side is a time-division-multiplex highway ML with a small number of channels and with separate paths for the two directions of communication, e.g. speech directions. Connected to the right-hand side is a time-division-multiplex highway MB1 with a large number of channels. The highway ML transmits 32 channels with 8-bit code words, for example. Each serially arriving code word is converted to parallel form in a serial-parallel converter and then temporarily stored in a row of a transmit memory TM. At the same time, a row of a receive memory RM is read out, and the corresponding code word is converted to serial form in a parallel-serial converter PS and applied to the outgoing line of the multiplex highway ML. Each of the two memories TM and RM has at least as many rows as there are channels on the highway ML. An address memory AM is read cyclically and causes each row of these memories TM, RM to be written and read in a given cycle. The write/read sequence of the memories TM, RM is dependent on which time slot on the multiplex highway MB1 was allocated to the connection by the central control. Via an addressing device AD, the addresses for the establishment of the connection are written into the associated rows of the continuously cyclically read address memory AM. Thus, each time switch can cyclically switch the set-up paths on its own. FIG. 2 also shows a local clock generator C which receives from the central control a basic clock signal for maintaining the necessary synchronism on the highway MB1 and derives therefrom the clock signals needed to control this time switch.

In the example, the 32 time slots present on the highway ML occupy 32 time slots of the total of, e.g., 256 time slots present on the highway MB1. The remaining time slots on the highway MB1 are occupied via other time switches connected in parallel, and those time slots on the highway MB1 occupied by different time switches may be arbitrarily graded.

In FIG. 2 a driver D is inserted in the line feeding the multiplex highway MB1. It is also indicated that this time switch MTSI may have a second multiplex highway MB2 with a large number of channels connected thereto. If the highways MB1, MB2 are used alternatively, there must be provided a branch at the transmit memory TM and a junction point at the receive memory RM, the pertinent control being easily combinable with the address memory.

What is claimed is:

1. A multiple stage switching network for time-division telecommunications switching, comprising a plurality of identical time slot interchanger switches, each of said switches including buffer stores for the temporary storing of time sot addresses and data to permit connections to be set up via a plurality of time-mulitplex-division highways in which a connection may include different channels in each highway, each of said interchanger switches including means for coupling from one end serving a smaller number of time-division channels to its other end serving a greater number of channels, said switches adapted for grouping in parallel between highways having a number of channels equal to the smaller number of channels and a common highway having at least said greater number of channels, said switches adapted for connection with the one end of a first switch coupled to the like end of a second switch and the other end of each of said first and second switches respectively coupled to highways having an identical number of channels for setting up a connection serially through said first and second switches.

2. A network according to claim 1, in which the buffer stores in said time switches include memories for coded information and cyclic control memories which permit a path to be cyclically switched through the time switches.

3. A network according to claim 1, in which time-division-multiplex highways with a small number of channels transfer data in serial form to interchanger switches at the one end thereof while the time-division-multiplex highways with a large number of channels may employ a plurality of conductors for data transfer.

4. A network according to claim 1, in which subscriber terminals coupled to said network are connected to one of the time-division-multiplex highways through a small number of channels via sampling gates.

5. A network according to claim 1, in which the time switches exchange control signals with one another in predetermined channels of the time-division-multiplex highways.

6. A switching network for coupling a plurality of subscriber terminals to a smaller plurality of time-division highways, said network including a plurality of blocks of sampling gates, said terminals being grouped with a group of terminals coupled to a block of sampling gates for coding data from the terminals of a group in time-division format for transmission over a first time-division highway having a first number of channels, a second time-division highway having a greater number of channels than said first number, a time slot interchanging switch interfacing between said first and second highways for interchanging time slots on said highways for the bidirectional transfer of data to and from said terminals, with said time slot switch having a first end for coupling to said first highway and a second end coupled to said second highway, said network further including a third highway with its number of channels identical to that of the second highway, and a pair of time slot switches each identical to said first-mentioned time slot interchanging switch interfacing between said second and third highways with the second end of each of said pair of time slot switches coupled to the second end of each of said pair of time slot switches coupled to the respective second and third highways and the first end of each of said pair of time slot switches coupled to one another.

7. A network as claimed in claim 6, in which each time slot switch includes a separate data memory for each direction of data transmission and further includes an address memory for controlling the reading and writing of data in both said data memories.

* * * * *